A. T. BROWN.
LUBRICANT RETAINING MEANS.
APPLICATION FILED JAN. 11, 1911.

1,072,421.

Patented Sept. 9, 1913.

WITNESSES:
Chas. H. Young.
J. B. Smith.

INVENTOR
Alexander T. Brown
BY
Parsons Hall & Bodell
ATTORNEYS

UNITED STATES PATENT OFFICE.

ALEXANDER T. BROWN, OF SYRACUSE, NEW YORK, ASSIGNOR TO BROWN-LIPE GEAR COMPANY, OF SYRACUSE, NEW YORK, A CORPORATION OF NEW YORK.

LUBRICANT-RETAINING MEANS.

1,072,421.   Specification of Letters Patent.   Patented Sept. 9, 1913.

Application filed January 11, 1911. Serial No. 602,086.

*To all whom it may concern:*

Be it known that I, ALEXANDER T. BROWN, of Syracuse, in the county of Onondaga and State of New York, have invented a certain new and useful Lubricant-Retaining Means, of which the following is a specification.

This invention relates to lubricant retaining means, particularly applicable for casings containing moving parts, as cranks, gearings, etc., operating in a lubricant bath, and has for its object a particularly simple and efficient means for preventing the lubricant from escaping out of the casing through an opening in the wall thereof for the passage of a rotating shaft, and the invention consists in the combinations and constructions hereinafter set forth and claimed.

In describing this invention, reference is had to the accompanying drawing, in which like characters designate corresponding parts in all the views.

Figure 1:
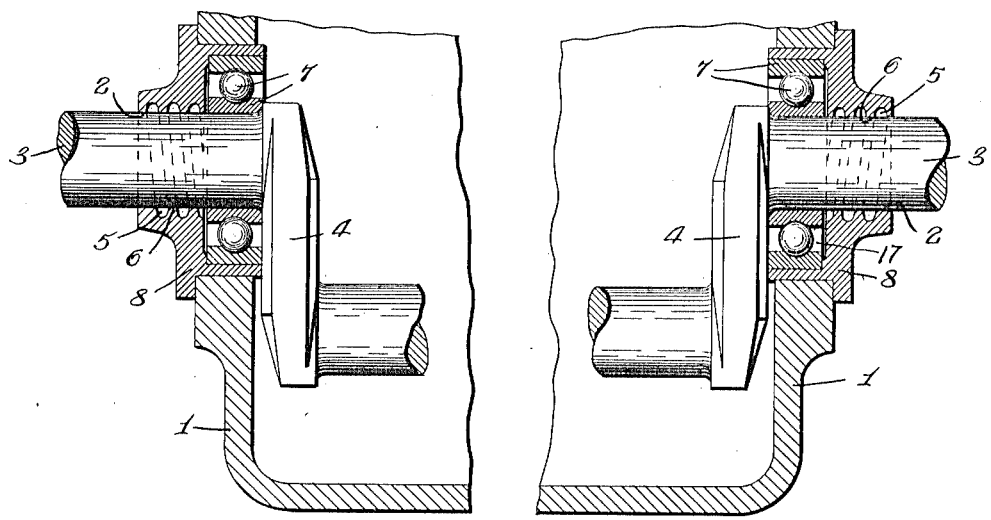
Figure 2:
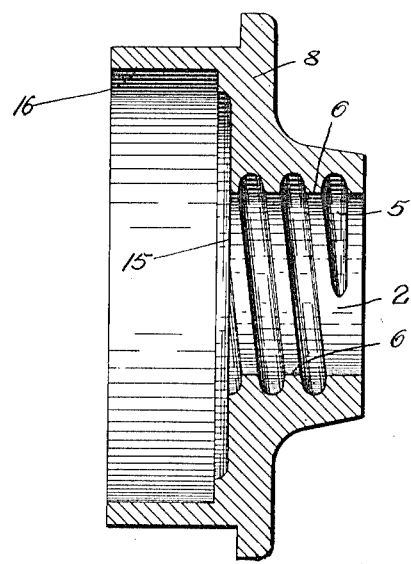

Figure 1 is a sectional view of one form of mechanism provided with my invention. Fig. 2 is a sectional view through a detached part of the casing.

My invention is here illustrated as applied to an engine base, but it will be understood that it may be applied to many constructions wherein a rotating shaft passes through the wall of a lubricant containing casing.

In many structures wherein splash lubrication is used and a revoluble shaft passes through an opening in the wall of a lubricant containing casing, such as an engine base or the casing of a transmission gearing, and the like, it is customary to keep the level of the lubricant more or less below the lower surface of the opening through which the shaft passes. Consequently, there is no tendency for leakage of the lubricant when the mechanism is idle. On the contrary, when the mechanism is in operation, the lubricant is violently agitated and tends to escape through openings in the casing, and in practice it is practically impossible to prevent leakage around the rotating shaft. By my invention I prevent this undesirable leakage without in any way impeding the rotation of the shaft or requiring adjustment or renewal of parts as in the use of stuffing boxes. In practice, it has been found that in the use of my invention, the level of the lubricant may be maintained much above the opening through which a constantly rotating shaft passes.

In the illustrated embodiment of my invention, 1 is a lubricant containing casing provided with an opening 2 extending through the wall thereof, and 3 is a rotating shaft passing through the opening 2 and provided with a part, as a crank 4, moving in a lubricant bath within the casing 1. The shaft 3 is shown as extending through openings 2 in opposite sides of the casing 1, but obviously this is not an essential feature of my invention. Neither is it essential that the moving part be a crank, since it may be any other suitable part, as a gear connected to the shaft 3.

Each of the openings 2 is provided with an internal thread 5 in the inner face of the opening, the apex 6 of the thread being in close proximity to the shaft 3 and such thread leading into or communicating with the interior of the casing 1 and inclining with respect to the direction of rotation of said shaft. Preferably, the surface of the shaft 3 opposed to the threaded surface of the opening 2 is in the form of an unbroken cylinder, and each opening 2 is provided with an annular surface 15 extending at an angle to the opposing surface of the shaft and to the outer annular surface provided with the thread 5, in a direction leading from the axis of the shaft, and is also provided with an inner annular surface 16 of greater diameter than said outer annular surface, and the thread 5 opens through the surface 15 which constitutes the outer end wall of an inner enlarged portion of the opening 2. Consequently, any oil tending to escape through the opening 2 along the rotating shaft 3 is fed by the thread 5 in the opposite direction toward the interior of the casing, and when such oil reaches the surface 15 it moves along said surface and away from the shaft.

In the illustrated embodiment of my invention, the thread 5 terminates short of the outer end of the opening 2, but this is not an essential feature of my invention. Moreover, I have shown a relatively deep thread with a comparatively wide and cylindrical apex, but any other form of thread may be used if desired. Preferably, the apex of the thread, although in close proximity to the shaft 3 is not in contact therewith, and, consequently, no wear or change occurs.

The shaft 3 is here shown as supported independently of the outer annular surfaces of the openings 2, provided with the threads 5, by antifriction bearings disposed at the inner sides of said surfaces and between the shaft 3 and the inner annular surfaces 16 of said openings, and said openings 2 are shown as provided in detachable sections or caps 8 mounted in openings in opposite upright walls of the casing, but any suitable bearing may be used for supporting the shaft 3, and it is not an essential feature of my invention that the bearing for the shaft shall be carried by a detachable part of the casing. In the illustrated construction of bearings 7 the spaces 17 in which the balls roll are spaced apart from the axis of the shaft 3 a greater distance than the surfaces of the openings 2 provided with the threads 5 and are connected to spaces formed between the intermediate annular surfaces 15 of the openings 2 and opposing outer end faces of the bearings 7, and consequently the oil moving along the faces 15 outwardly from the shaft, as previously described, passes through said spaces and through the bearings 7 to the interior of the casing.

What I claim, is:—

1. The combination with a rotating shaft, of a lubricant-retaining means having an opening for receiving the shaft, the opening being formed with a surface concentric with the shaft, and a second surface extending at an angle to the first-mentioned surface in a direction leading from the axis of the shaft, the first-mentioned surface being provided with an internal thread inclining with respect to the direction of rotation of the shaft and opening through the second-mentioned surface whereby the lubricant moves along the internal thread and then along the second-mentioned surface and away from the shaft, means for receiving the lubricant passing along the second-mentioned surface and away from the shaft, and means independent of the threaded surface for supporting the shaft, substantially as described.

2. The combination with a rotating shaft, of a lubricant-retaining means having an opening for receiving the shaft, opposing surfaces of the shaft and the wall of the opening being in close proximity but out of contact with each other, said surface of the wall being provided with an internal thread inclining with respect to the direction of rotation of the shaft, one end of the thread extending through the inner end of the last-mentioned surface and the other end of the thread terminating short of the outer end of said surface, and means independent of the threaded surface for supporting the shaft, substantially as described.

3. The combination with a rotating shaft, of a lubricant-retaining means having an opening for receiving the shaft, the opening being formed with a surface concentric with the shaft and provided with an internal thread inclining with respect to the direction of rotation of the shaft, and bearing means arranged at the inner side of said surface and supporting the shaft, said bearing means being provided with a passage spaced apart from the axis of the shaft a greater distance than said surface, the passage communicating with the thread whereby the lubricant moves along the thread and through said passage, substantially as set forth.

4. The combination with a rotating shaft, of a lubricant-retaining means having an opening for receiving the shaft, the opening being formed with a surface concentric with the shaft, and a second surface extending at an angle to the first-mentioned surface in a direction leading from the axis of the shaft, the first-mentioned surface being provided with an internal thread inclining with respect to the direction of rotation of the shaft and opening through the second-mentioned surface, and bearing means arranged at the inner side of the first-mentioned surface, a surface of the bearing means being opposed to, and spaced apart from, the second-mentioned surface, and the bearing means being provided with a passage opening from said surface of the bearing means, whereby the lubricant moves along the thread and then laterally away from the shaft and between the second-mentioned surface and the opposing surface of the bearing means and thereafter through the passage of said bearing means, substantially as described.

5. The combination with a rotating shaft, of a casing containing a body of lubricant and having one of its walls provided with an opening for receiving the shaft, opposing surfaces of the shaft and the wall of the opening being in close proximity but out of contact with each other, said surface of the wall of the opening being provided with an internal thread inclining with respect to the direction of rotation of the shaft, whereby the lubricant moves along the internal thread toward the interior of the casing, and bearing means arranged at the inner side of said surface and supporting the shaft, said bearing means being provided with a passage of greater diameter than the opposing surfaces, the passage communicating with the interior of the casing and with said thread, substantially as described.

6. The combination with a rotating shaft, of a casing containing a body of lubricant and having one of its walls provided with an opening for receiving the shaft, means within the casing movable with the rotation of the shaft and within the lubricant in the casing, a surface of the wall of said opening opposed to the shaft being provided with an internal thread inclining with respect to the direction of rotation of the shaft, whereby the lubricant moves along the internal thread toward the interior of the casing, an additional surface of said wall at the inner side of the first mentioned surface and an opposing surface of the shaft being spaced apart, and antifriction bearing means between said spaced apart surfaces, said means including a passage communicating with the interior of the casing and with said internal thread, substantially as described.

7. The combination with a rotating shaft, of a casing containing a body of lubricant and having one of its walls provided with a detachable section formed with an opening for receiving the shaft, said opening having an outer annular surface, an inner annular surface, and an intermediate annular surface arranged between the inner and outer annular surfaces at an angle thereto, the outer surface being of lesser diameter and being provided with an internal thread opposed to the shaft and inclining with respect to the direction of rotation of the shaft and opening through the intermediate annular surface, and anti-friction bearing means between the shaft and the inner annular surface, said means being provided with a passage communicating with the thread whereby the lubricant moves along the thread and through said passage, substantially as set forth.

In testimony whereof, I have hereunto signed my name in the presence of two attesting witnesses, at Syracuse, in the county of Onondaga, in the State of New York, this 9th day of January, 1911.

ALEXANDER T. BROWN.

Witnesses:
L. Davis,
S. Davis.